(12) United States Patent
Siers et al.

(10) Patent No.: US 11,956,366 B1
(45) Date of Patent: Apr. 9, 2024

(54) COMPUTER IMPLEMENTED ZERO TRUST AUTHENTICATION METHOD

(71) Applicant: James Michael Siers, Dublin, OH (US)

(72) Inventors: James Michael Siers, Dublin, OH (US); Maxwell Dignan, Delaware, OH (US)

( * ) Notice: Subject to any disclaimer, the term of this patent is extended or adjusted under 35 U.S.C. 154(b) by 0 days.

(21) Appl. No.: 18/496,870

(22) Filed: Oct. 28, 2023

(51) Int. Cl.
*H04L 9/40* (2022.01)
*H04L 9/32* (2006.01)

(52) U.S. Cl.
CPC .................. *H04L 9/3236* (2013.01)

(58) Field of Classification Search
CPC ......... G06F 21/31; H04L 9/50; H04L 9/3236; H04L 63/08
See application file for complete search history.

(56) References Cited

U.S. PATENT DOCUMENTS

| | | |
|---|---|---|
| 10,911,239 B2 | 2/2021 | Vamos et al. |
| 11,108,811 B2 | 8/2021 | Grebovich |
| 2014/0380418 A1* | 12/2014 | Wang ............... H04L 9/302 726/3 |
| 2020/0313892 A1* | 10/2020 | Vamos .............. G06F 21/31 |
| 2021/0224795 A1* | 7/2021 | Song ............... G06Q 20/027 |

OTHER PUBLICATIONS

Golla et al., "I want my money back!" Limiting Online Password-Guessing Financially, 6 pages, Jul. 2017 (Year: 2017).*

* cited by examiner

*Primary Examiner* — Thaddeus J Plecha
(74) *Attorney, Agent, or Firm* — Calrie Marsh, Esq.

(57) ABSTRACT

The present invention comprises a computer-implemented zero-trust authentication method that utilizes the Bitcoin Lightning Network, which is the sole protocol offering immediate, immutable, and cost-free Bitcoin settlement. A user requests access to the resource of a service provider and the user provides authentication material necessary to securely access the service provider. The service provider initiates a Hold Invoice via a cryptographic function to generate a pre-image hash, instructing the user to authorize release of Bitcoin in an amount stipulated by the Hold Invoice. Bitcoin is held in the Hold Invoice until an authentication attempt is either successful or unsuccessful. If successful, the user is issued an access token to login into the resource, the Hold Invoice is canceled and Bitcoin is released to the user. If unsuccessful, the pre-image is revealed, the user is denied access, and Bitcoin is transferred to the service provider as a settled payment transaction.

14 Claims, 8 Drawing Sheets

COMPUTER IMPLEMENTED ZERO TRUST AUTHENTICATION METHOD

STATEMENT REGARDING FEDERALLY SPONSORED RESEARCH OR DEVELOPMENT

This invention has been created without the sponsorship or funding of any federally sponsored research or development program.

FIELD OF INVENTION

The present invention relates to system controls pertaining to authentication material (i.e., username, password, MFA, ClientID, secret, etc.) required for access to a computing device, computing network, and/or computer programs, and, in particular, a method for protecting the authentication processes against brute force and denial-of-service attacks. In addition, this invention relates to the systems controls for a corresponding computing device, computing network and computer program product.

BACKGROUND OF THE FIELD OF INVENTION

Typical authentication methods for computer programs, relying on usernames, user passwords, API clientIDs, and API secret tokens, frequently face security threats. This vulnerability arises due to embedding logical constraints within software that are not able to fully deter malicious entities from manipulating the software's logic. Instead, embedded logical constraints merely alter the tactics employed by malicious entities to exploit the software's inherent logic.

In particular, brute force attacks employ automation to systematically test a vast array of authentication credentials, aiming to deduce the correct access details. For instance, if a user opts for a basic password-such as using collocated words—the likelihood of the access credentials being effortlessly deciphered increases.

Various techniques exist for executing brute force assaults on authentication procedures, such as those of web applications. One approach might involve targeting a specific user role (e.g., "System Administrator") and attempting a multitude of potential passwords for that role. Conversely, an attacker might fixate on a likely password (e.g., "Password123") and test it across multiple user accounts. Notably, in applications with extensive user bases, there's a heightened chance of identifying at least one user who has opted for that exact password.

Traditional defenses against brute force attacks on authentication systems are in place, but are still at risk for brute force attacks. One such defense mandates users to adopt passwords with intricate compositions. This often means passwords must meet certain criteria, such as a minimum length or the inclusion of unique characters and numbers. However, this can pose a challenge for users trying to recall their passwords. As a workaround, users might opt for seemingly complex yet predictable passwords such as "Password!2345". While these passwords technically adhere to the set guidelines and are thus system-approved, they remain susceptible to easy guessing, thus reducing the security of the authentication controls.

Another traditional safeguard involves temporarily disabling user accounts after a series of unsuccessful authentication attempts. Under this system, accounts are suspended following multiple failed logins and can only be reactivated by an administrator or after a set duration. Yet, malicious actors can manipulate this feature to instigate a denial of service, deliberately making false login authentication attempts to lock out specific users. For instance, attackers might deploy automated tools to sift through potential authentication tokens swiftly, leveraging any discernible patterns in the token creation algorithm to anticipate valid tokens. This strategy becomes particularly potent if tokens lack randomness or aren't frequently updated.

Rate limiting is another protective strategy currently in use, where the system monitors the number of failed authentication attempts from a particular IP address within a specified timeframe. Exceeding a certain threshold result in the IP address being barred from further attempts at login authentication. This method, however, poses challenges when multiple genuine users share the same IP address, perhaps due to Network Address Translation (NAT) or the use of a proxy server.

One-Time-Tokens represent another security measure in use, which is often employed in processes such as PIN/TAN (Personal Identification Number/Transaction Authorization Number) logins, Two-Factor-Authentication via SMS, or time-based OTP (one-time passwords) systems such as Google Authenticator. However, these tokens, being another form of encoded logic controls, are not immune to exploitation. Moreover, implementing such measures necessitates preliminary registration actions, essentially tying steps, which can be tedious and demand extra effort from the token's user.

A more recent advancement has been to incorporate transferring financial value for a temporary login token via Blockchain. Reference Vamos et al., U.S. Pat. No. 10,911, 239, filed Oct. 10, 2018 and issued Feb. 2, 2021 discloses this method. Vamos et al. describes "transferring a first financial value from the user to a token provider for a temporary login token; performing a login attempt on the service provider, wherein the login attempt requires user specific login data and the temporary login token; transferring a second financial value to the user and invalidating the temporary login token if the login on the service provider was successful within a predefined number of login attempts, wherein the second financial value has the same value as the first financial value or is within a variance amount."

This process as disclosed in Vamos et al. has its limitations, as both the user and service provider (i.e., computer network) must pay fees and wait for settlement of the on-chain transactions. Presently there are several cryptocurrencies that offer almost immediate transaction settlement; however, they lack the security features of Bitcoin, and therefore the instant settlement they provide comes with reduced security from fraud or brute force attacks. Moreover, the process disclosed in Vamos et al. outlines two on-chain transactions, which doubles the fees and time. Conducting such a process is costly, prone to vulnerability, and must occur with every valid or invalid authentication attempt, posing problems to valid users simply trying to access the network.

Should the aforementioned protective measures and their inherent drawbacks be deemed unsuitable for a particular application, it becomes evident that brute force attacks might be executed on an authentication process that relies on encoded logic for security. The industry is in dire need of a solution that transcends mere encoded logic defenses and steers clear of on-chain transactions, while remaining immutable to fraud, and thus removing both financial and temporal burdens.

BACKGROUND OF THE INVENTION

The present invention utilizes existing Bitcoin Proof-of-Work Protocol and the Bitcoin Lightning Network to create a zero-trust authentication method that is immutable to fraud and eliminates the financial and temporal burdens presented by traditional and/or current authentication methods. The present invention capitalizes on the computationally demanding, energy and time-intensive safeguards crafted to shield against service misuse. Concurrently, the present invention utilizes the Bitcoin Lightning Network, the sole protocol offering immediate and cost-free Bitcoin settlement at the Application Layer of any Open System Interconnection Model (OSI Model), including but not limited to a Five-Layer or Seven-Layer OSI Model.

While the term "cryptocurrencies" is largely associated with financial software development, there's a noticeable neglect or apathy towards the seismic shift in cybersecurity brought about by proof-of-work security networks, with Bitcoin being the most prominent. Notably, the vast majority of cryptocurrencies, excluding Bitcoin, are navigating a changing landscape of financial regulations, detached from cybersecurity concerns. This is because entities such as the Securities and Exchange Commission (SEC) have classified them as "securities".

The present invention significantly improves on the authentication method of transferring financial value for a temporary login token via Blockchain. While innovative, the existing methods excludes the intricacies of Bitcoin's Layer 1 Proof-of-Work Protocol, and its Layer 2 the Lightning Network. Considering software's intangible nature, imposing physical constraints on its security appears unfeasible unless the foundational apparatus (i.e., the computer) hosting the software possesses concrete limits. Comprehending this principle is essential before engaging in discussions surrounding proof-of-work frameworks such as Bitcoin.

The Bitcoin network achieves its robust security by self-imposing significant physical demands, marked by its high energy consumption and the necessity for specialized devices, termed Application-Specific Integrated Circuit (ASIC) Miners. These machines validate transactions to thwart fraudulent activities and append new blocks to the blockchain. Bitcoin's consensus protocols mandate that all miners, whether employing ASICs or alternative hardware, vie to discover the succeeding legitimate block. Upon mining a block, the entire network scrutinizes it, and if compliant with the established rules, it's integrated and expanded upon. This architecture, when paired with the proof-of-work method, fortifies the network against potential breaches and upholds the blockchain's authenticity. Those who deem the Bitcoin network "inefficient" might be missing its core energy rationale-security—and possibly undervaluing the transformative nature of the proof-of-work approach.

Proof-of-work symbolizes the method of securing software by physically limiting the underlying computer network that operates it, enforcing physical restrictions (namely power demand) on running critically important software as a preventive security countermeasure against systemic exploitation of that software. Given the non-material nature of software, this technique is novel, counter-intuitive, and profoundly significant. This technique essentially suggests that humans have managed to connect the bounds of physical reality with cyberspace, unreachable by the full control of any single individual or entity, making exploitation or data tampering practically impossible by any person or entity.

The term "Proof-of-Work" (PoW) has its roots in computer science and cryptography, denoting a system that requires evidence of specific computational effort. For the SHA-256 function, the expected number of attempts to find the correct entry is $2^{256}$. Taking into account that a normal computer can calculate an average of sixty (60) million hashes per second, this computer would take approximately thirty-quinquagintillion (that's a three times ten followed by 153 zeros or $30^{153}$) years to find the pre-image.

To put it in perspective, $2^{256}$ is close to the number of atoms there are in the universe. Therefore, finding the pre-image of a SHA-256 function hash is such as picking an atom in the universe and hoping it's the right one! Essentially guaranteeing that any asset stemming from a Proof-of-Work protocol is genuine and cannot be duplicated, nor can it be altered after settlement. The reference "*Pricing via Processing or Combatting Junk Mail*", a 1993 publication by Cynthia Dwork and Moni Naor, was the first present the idea of "Proof of Work", but the term was subsequently defined in a 1999 publication by Markus Jakobsson and Ari Juels.

The pioneering application of PoW was Adam Back's "Hashcash", which was specifically designed to counter spam emails and DoS (Denial of Service) attacks. Within the framework of a PoW system, a service requester, such as an email sender, is required to execute a computation that is moderately challenging yet achievable in order to authenticate their request. This design imposes both computational and temporal burdens on spammers looking to dispatch mass emails or on attackers aiming to overwhelm a network with excessive requests, thus offering a protective layer against abuse of services.

The energy-demanding nature of the Proof-of-Work mechanism, which fortifies the Bitcoin Network against tampering, also rendered Bitcoin less viable for immediate transactions. This limitation was addressed when Joseph Poon and Thaddeus Dryja introduced the Bitcoin Lightning Network—a Layer 2 protocol built atop the Bitcoin Proof-of-Work Network. This innovation was crafted to facilitate swift and cost-free authentication communications/transactions between two parties within a shared channel.

Although the Bitcoin Lightning Network is commonly perceived as a peer-to-peer transaction system, facilitating almost cost-free financial exchanges without the need for third-party oversight, its second layer essentially trades Bitcoin. The Bitcoin is derived from the energy-demanding Proof-of-Work network, which carries substantial real-world expenses for acquisition.

After obtaining Bitcoin through the energy-intensive Proof-of-Work network, users can "trade" Bitcoin on the Bitcoin Lightning Network for any purpose they see fit, operating within a trustless framework, devoid of third-party approval. Given that software lacks tangible form, introducing physical limitations via the properties of Bitcoin's PoW Protocol constrains authentication attempts between (1) a user or (1a) a client and (2) a corresponding computing device, network, or program to the detriments imposed by the energy and capital expense needed to acquire the Bitcoin. This approach, not only enhances but also circumvents the susceptibilities of the encoded logic controls previously discussed.

This design diminishes the allure for attackers to execute brute-force or forms of denial-of-service assaults. Essentially, for an authentication effort within this system, the Bitcoin must be sourced externally (from the Bitcoin Layer 1 Blockchain) and then utilized as the authentication data within our network for every distinct attempt.

Accordingly, there is a need for improved protection measures for authentication procedures of service providers to counteract brute force attacks, addressing the previously highlighted shortcomings of existing methods or systems.

SUMMARY OF INVENTION

The present invention solves the inherent vulnerabilities of existing software authentication protocol as described in the Background of the Field section of this disclosure. The present invention capitalizes on the computationally demanding, energy and time-intensive safeguards crafted to shield against service misuse that has been the hallmark of cryptocurrencies, and more specifically Bitcoin. The present invention utilizes the Bitcoin Lightning Network, which is the sole protocol offering immediate, immutable, and cost-free Bitcoin settlement at the Application Layer of a Five-Layer or Seven-Layer OSI Model. While Bitcoin has been used mainly as one of the most secure forms of currency, the present invention is focused on Bitcoin's built-in authentication protocol as a means of guaranteeing secure and trustless authentication over a myriad of software and/or industries that rely heavily on software.

The present invention is an authentication method comprising a sequence of steps. In the first step, a user/client initiates an access request—defined as a request to attain material necessary to securely identify with a service provider. In response, the service provider initiates a "Hold Invoice." The user or client then authorizes the release of Bitcoin in an amount stipulated by the "Hold Invoice" into escrow prior to completing the process of authenticating access.

In a secondary step, once the user/client authorizes the release the Bitcoin amount required to satisfy the contract stipulated in the "Hold Invoice", the resource unlocks permission to authenticate access. When a user/client performs an authentication attempt on the resource using the specific authentication material, authentication process will result in a successful or unsuccessful authentication attempt.

If the user/client is successful on the authentication attempt into the resource, the "Hold Invoice" is canceled by the resource and an access/identity token is provided. The Bitcoin is never actually released by the user/client; therefore, no transaction occurred. If the user/client is unsuccessful on the authentication attempt into the resource, the resource will reveal the "pre-image," which is deemed necessary by the script in order to authorize the release of the Bitcoin held by the "Hold Invoice." The Bitcoin is released to the service provider in a single transaction. This progression will continue until a user/client produces successful authentication material and/or a user/client abandons the process.

The present invention provides an improved method for safeguarding access procedures against denial of service and brute force attacks. This method integrates the use of "Hold Invoices" within the Bitcoin Lightning Network, offering a zero-trust approach that can be achieved by using time locks as a component to global consensus. This is regulated by the Proof-of-Work (PoW) consensus rules inherent to the Bitcoin Protocol, ensuring immediate and accurate settlement of Bitcoin for every authentication attempt, whether authorized or not. Concurrently, supplementary authentication measures operate seamlessly in the background for the user/client, rendering the incentive of brute-force and denial-of-service attacks inefficient, thus deterring potential attackers.

According to the method of the embodiments of this invention, the access authentication process is fortified by a cryptographic hash function, requiring that a user/client leverage Bitcoin to meet the conditions of "Hold Invoice" terms set forth by the resource in the form of a pre-image, (a.k.a. smart contract script). Furthermore, this contract is secured by mathematical function called SHA-256, ensuring authenticity of the "Hold Invoice" and Bitcoin authorized for that "Hold Invoice." This ensures genuine settlement on Bitcoin's Layer 2 "Hold Invoice", emphasizing the integrity of the Proof-of-Work system and the authenticity of settlements.

In particular, a user or client who wants to register with a resource or service provider must have already verified authenticity through SHA-256 by possessing the Bitcoin needed to successfully request and complete an access attempt. If a user or client is unable to satisfy a service provider's "Hold Invoice," the user is prevented from proceeding with submitting authentication material. Likewise, an attacker who wants to carry out several thousand access request operations in the context of brute force attack, for example, will be required to satisfy a service provider's "Hold Invoice," before each attempt, rending the procedure too intensive. Therefore, alternative security mechanisms such as locking user/client accounts or setting up rate limits against IP addresses will be more of an exception than a rule. In addition, the service provider may benefit from the brute force attacks that have been attempted without success because Bitcoin is transferred to the service provider with each failed attempt.

This invention's utilization of the Bitcoin protocol and the Bitcoin Lightning Network provides a solution to the low level or encoded logic authentication systems currently in use. This invention significantly limits and, in most cases, prevents brute force attacks, and not only protect users and service providers, but penalizes failed attempts at authentication.

DESCRIPTION OF THE INVENTION

Before the subject invention is described further, it is to be understood that the invention is not limited to the particular embodiments of the invention described below, as variations of the particular embodiments may be made and still fall within the scope of the invention. It is also to be understood that the terminology employed is for the purpose of describing particular embodiments and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials or operations are not shown or described in detail to avoid obscuring certain aspects.

In this specification, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

In order to fully describe the present invention various terms and backend functions in the art to which this invention belongs must be defined and/or explained. The Bitcoin Blockchain is designed to be immutable. Once a transaction is confirmed and added to a block, and as more blocks are added on top of that block, it becomes economically and physically impractical to change that transaction. This immutability is achieved through the decentralized consensus mechanism and cryptographic hashing.

The immutability of Bitcoin's blockchain is one of its defining characteristics and is crucial for its role as a trustless system. Once transactions are confirmed, they remain unaltered, instilling confidence in the network without needing central entities. Unlike conventional systems such as banks, which may reverse transactions through chargebacks even long after their execution, Bitcoin's steadfastness guards against such changes. This is invaluable in environments with potential trust issues or high fraud risks. The Bitcoin Lightning Network, layered atop the primary Bitcoin network, enhances transaction speed and scalability, further contributing to the discourse on Bitcoin's unwavering nature.

The Lightning Network facilitates off-chain transactions within a series of payment channels, bypassing the need of recording each transaction on the Bitcoin blockchain for swift and cheap exchanges. Users establish payment channels, enabling multiple transactions between participants without blockchain broadcasts for each transaction. Only when channels are initiated or closed are their transactions broadcasted to the Bitcoin blockchain.

In the case of this invention, the payment channel can be broadcast to the Bitcoin blockchain when a Software Provider provides inbound liquidity. Since the Service Provider's initial announcement specifies the amount of Bitcoin their network will utilize, this amount is recorded on the Bitcoin Blockchain. The Service Provider's initial announcement offers a record of its Bitcoin holdings, while the details contained in a Hold Invoice confirms whether the Bitcoin was settled in accordance with its terms.

A Hold Invoice in the context of this invention is a digital escrow that can be used in situations where an intermediary or escrow service is needed. A "Hold Invoice" is generated by using a "pre-image", which is a set of bytes that when processed through a mutually agreed-upon algorithm such as SHA-256, it produces a distinct byte sequence known as the hash digest, commonly referred to as the "hash". A Hold Invoice may have other uses known by a person of ordinary skill in the art to which Hold Invoices belong. Bitcoin is held within a Hold Invoice until conditions are met (i.e., successful authentication material is provided), and the hold is either removed to transfer the Bitcoin or canceled to release the Bitcoin. A Hold Invoice can be executed through a Hash-Time-Locked-Contract (HTLC), or a Point-Time-Locked-Contract (PTLC).

A Hashed Time-lock Contract (HTLC) is a type of smart contract used in the Lightning Network to ensure that a transaction is either fully completed or fully refunded without the need for a middleman. It combines two mechanisms:

Hash-Lock: This ensures that the recipient can only claim the funds if they know a particular piece of data (a pre-image) that produces a specific hash.

Time-Lock: This ensures that the funds are locked up only for a certain period. If the recipient does not claim the funds within this period, the sender can reclaim them.

A Point Time-lock Contract (PTLC) is an advanced contract mechanism proposed for the Lightning Network to enhance privacy and enable more flexible payment conditions. It is an evolution of the HTLC, with a primary difference in how it locks the funds, while retaining the same Time-Lock mechanism:

Point-Lock: Instead of using a hash and pre-image mechanism as found in HTLCs, PTLCs utilize a point and scalar on an elliptic curve. The recipient can only claim the funds if they know a specific scalar (a private key) related to a public point.

Time-Lock: This ensures that the funds are locked up only for a certain period. If the recipient does not claim the funds within this period, the sender can reclaim them.

Figure 1:
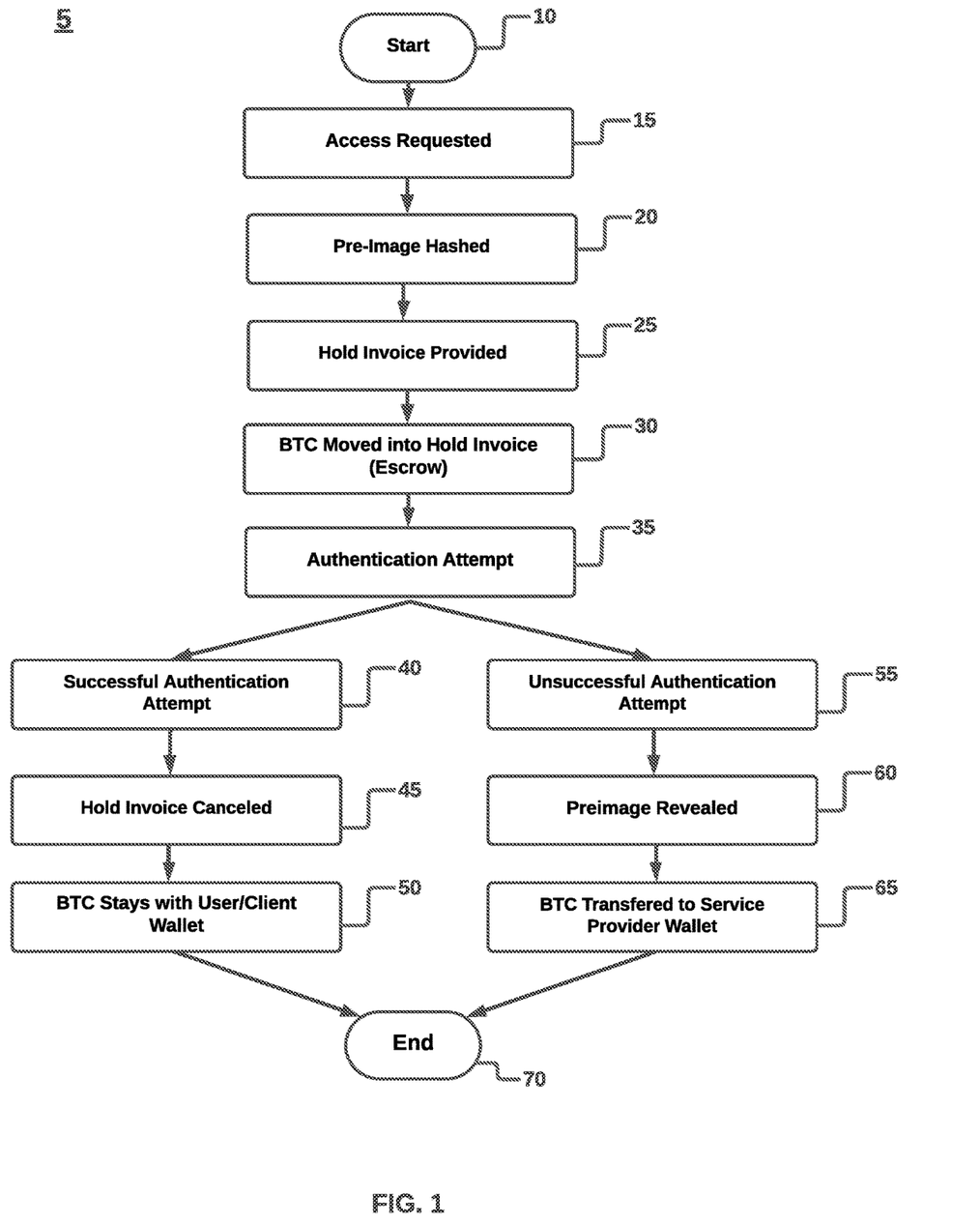
FIG. 1 is a flow chart illustrating an overview of the Bitcoin Lightning Network Authentication component of the present invention.

The present invention comprises an associated computer program product, and a computing network, which all together create a zero-trust authentication method to defend against brute-force assaults that target a service provider's authentication protocol. FIG. 1 provides an overview of the method of the present invention which incorporates a feature of the Bitcoin Lightning Network known as a Hold Invoice. A Hold Invoice is executed through either a Hash-Time-Locked-Contract (HTLC), or a Point-Time-Locked-Contract (PTLC).

As shown in FIG. 1, the method of this invention includes an authentication process 5 which starts 10 when a User or Client requests access 15 to a resource from a service provider. This request 15 prompts a cryptographic hash function to be initiated resulting in the creation of a pre-image hash 20. Once the pre-image is hashed 20, then the service provider generates a Hold Invoice 25. A Hold Invoice 25 functions as a script, serving as a trustless peer-to-peer escrow mechanism, specifically between a User or Client and a service provider in the context of this invention. Once conditions are met, a Bitcoin is moved into the Hold Invoice 25 which now serves as an escrow for the Bitcoin, meaning further instructions are required to distribute it to an intended recipient depending on the success of the authentication attempt. In this case, the Hold Invoice 25 has a redemption clause, whereby the Bitcoin can be transferred to a predetermined recipient, or kept in the ownership of the User or Client. Once the Bitcoin is moved into the Hold Invoice 30, the User or Client is prompted to make an authentication attempt 35 using authentication material (e.g., username, password, etc.). If the User has a successful authentication attempt 40, then the Hold Invoice 25, 30 is canceled 45 by the service provider, and the Bitcoin is returned to the User 50, thus ending the process 70. However, if the User has an unsuccessful authentication attempt 55, then the pre-image 20 is revealed 60 and the Bitcoin is transferred to the Service Provider 65 and the process 70 ends.

Figure 2:
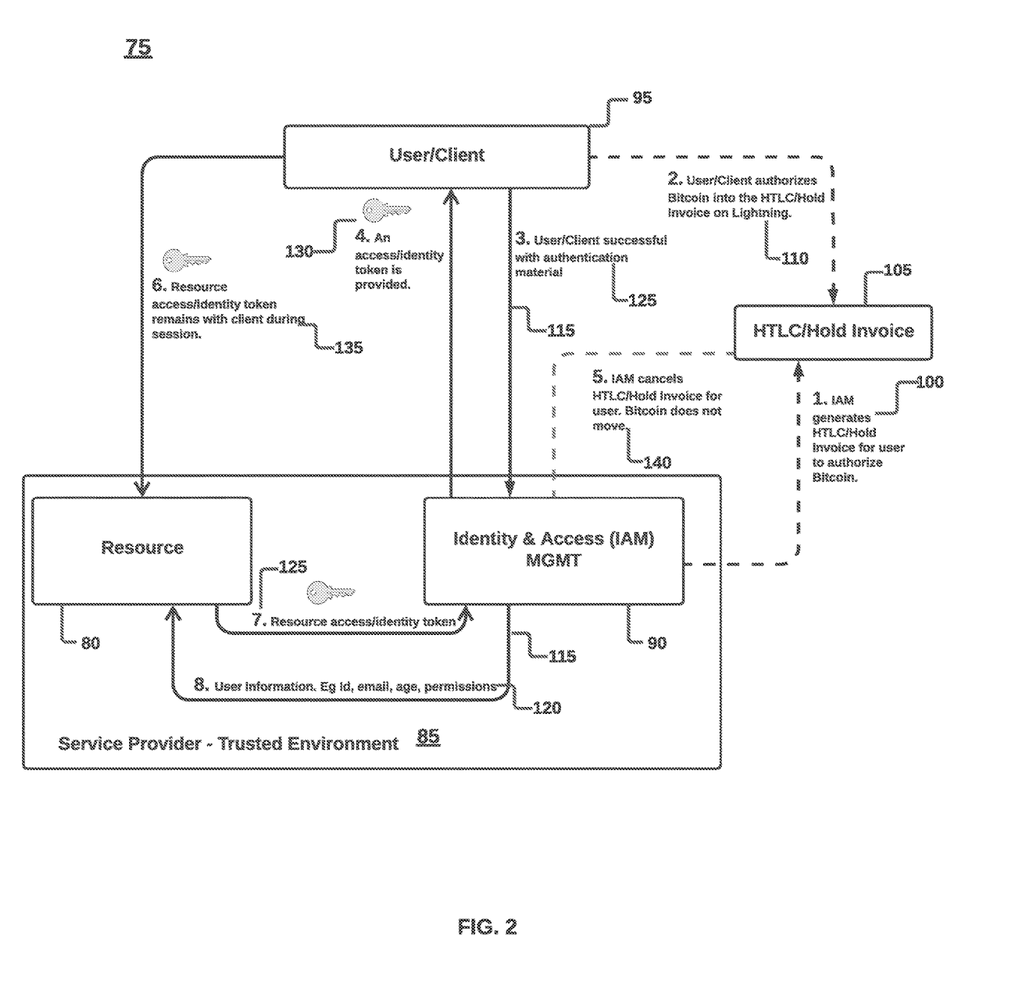
FIG. 2 is a flow chart illustrating the successful authentication method of the present invention.

FIG. 2 provides a more detailed description of a successful authentication attempt 75. As shown in FIG. 2, a Resource 80 from a service provider has a trusted environment 85 that includes an identity and access management interface (IAM) 90 via which a User 95 requests access to the resource 80 of the service provider. The User's 95 request prompts the IAM 90 to generate 100 a Hold Invoice 105 coded with instructions for the User 95 to authorize the movement of Bitcoin 110 into the Hold Invoice 105. Once the User 95 authorizes the movement of the Bitcoin 110 into the Hold Invoice 105, the User or Client 95 is prompted to make an authentication attempt 115 using authentication material (username, password, etc.) 120. For a successful authentication 125, the authentication material is verified by the IAM 90, then the IAM 90 generates an access or identity token 130 specific to the User 95 and the User's login session 135; and almost simultaneously cancels 140 the Hold Invoice 105 and the Bitcoin is retained by the User 95. The term "almost simultaneously" as used herein, refers to the de minimis fraction of a second or nanosecond it takes for the two steps to occur in this sequence of the present invention. The steps essentially occur at the same time. The User 95 maintains the same identity token 130 throughout the entire login session 135 for the Resource's 80 trusted environment 85. The identity token 130 is terminated once the User 95 logs out or times out from the Service Provider Resource 80, and the User 95 will be issued a new and unique identity token for each subsequent authentication session. As different service providers may have varying network security login time limits, a User 95 may be logged out or timed out within seconds of the login session or minutes or days or weeks or months. The present invention is adaptable to the varying security login time limits as long as the authentication process is successful.

Figure 3:
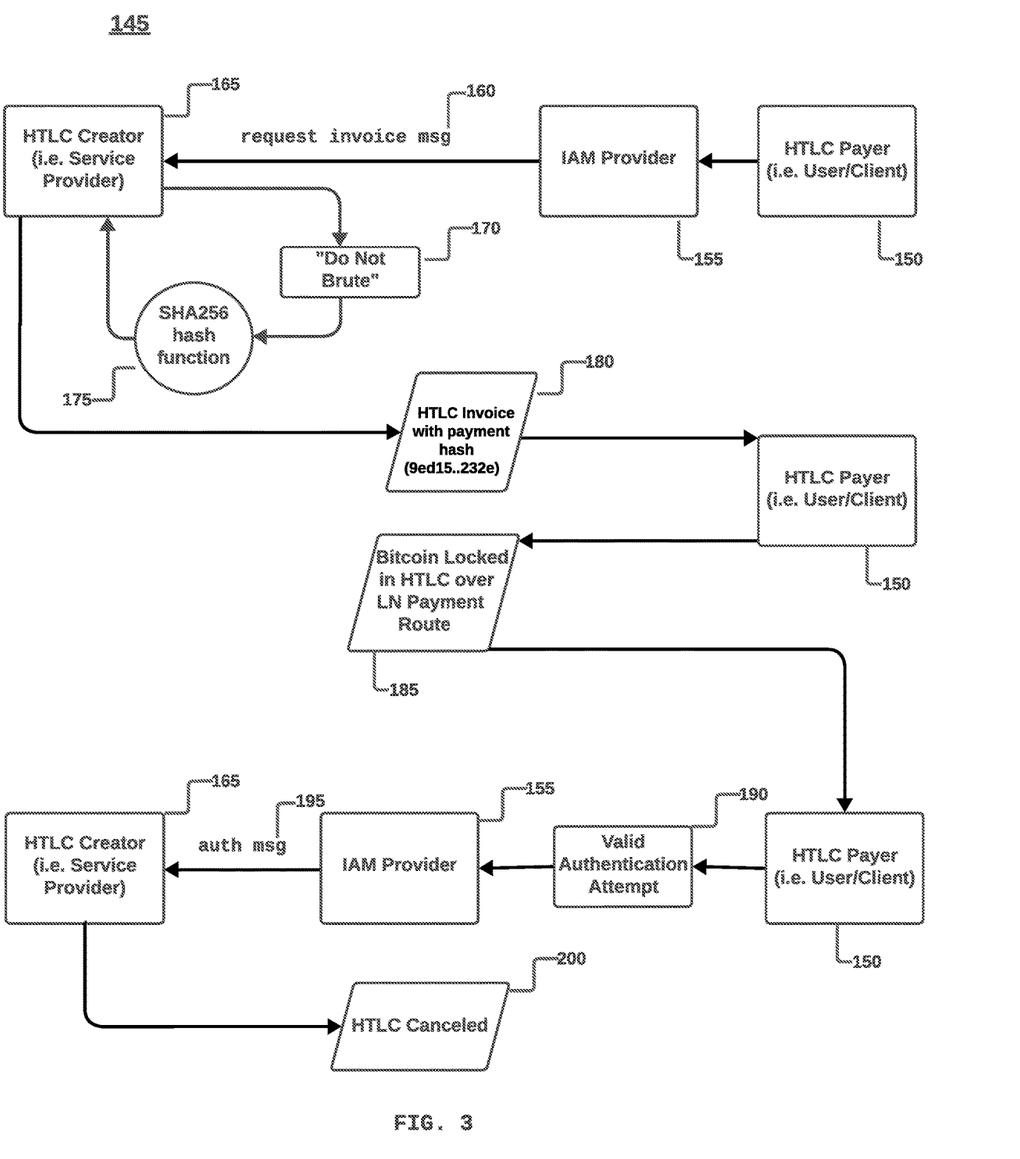
FIG. 3 is a flow chart illustrating the cryptographic hash function for a successful authentication method of the present invention.

FIG. 3 provides a more detailed illustration of the sequence of steps for a successful authentication attempt via a Hash-Time-Locked-Contract (HTLC) Hold Invoice 145. A HTLC User 150 via an IAM provider 155, requests access 160 from a service provider or HTLC Creator 165, and a cryptographic hash function is initiated to create a Hold Invoice. The HTLC Creator 165 issues a specific Bitcoin pre-image, in this case "Do Not Brute" 170 which is then processed through a mutually agreed upon algorithm, in this case SHA-256 hash function 175, resulting in a HTLC Hold Invoice 180 with a distinct and immutable payment hash. The User 150 receives the HTLC Hold Invoice 175 instructions and pre-authorizes Bitcoin to the HTLC Hold Invoice over a LN Payment route 185. With the Bitcoin securely held in the HTLC Hold Invoice 185, the User 150 initiates a valid authentication attempt 190 which is processed by the IAM Provider 155 which sends an authorization message 195 to the HTLC Creator 165. Almost simultaneously, the User 150 is granted secure access to a Resource 80 (as shown in FIG. 2), and the HTLC Hold Invoice 185 is canceled 200, releasing the Bitcoin back to the User 150. A successful authentication 145 is completed and the User 150 has a secure login session, protected from fraud and any brute force attack.

Figure 4:
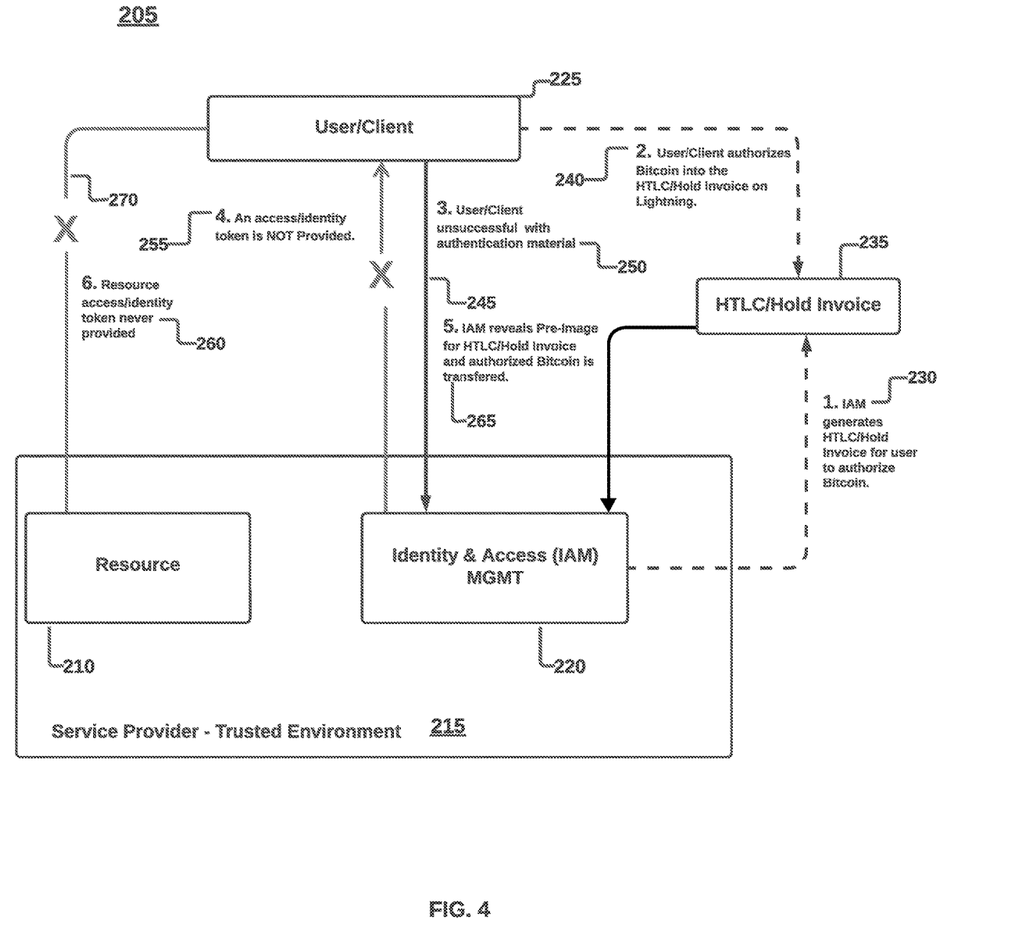
FIG. 4 is a flow chart illustrating the unsuccessful authentication method of the present invention.

FIG. 4 provides a more detailed description of an unsuccessful authentication attempt 205. As shown in FIG. 4, a Resource 210 from a service provider has a trusted environment 215 that includes an identity and access management interface (IAM) 220 by which a User 225 requests access to the resource 210 of the service provider. The User's 225 request prompts the IAM 220 to generate a Hold Invoice 235 coded with instructions for the User 225 to authorize the movement of a Bitcoin 230 into the Hold Invoice 235. Once the User 225 authorizes the movement of the Bitcoin 240 into the Hold Invoice 235, the User or Client 225 is prompted to make an authentication attempt 245 using authentication material (username, password, etc.). For an unsuccessful authentication 205, the authentication material is not verified 250 by the IAM 220, therefore, the IAM 220 does not generate an access or identity token 255 specific to the User 225 and the User's login session 260; and almost simultaneously reveals the pre-image 265 for the Hold Invoice 235 and the Bitcoin is transferred to the Service Provider 215. The term "almost simultaneously" as used herein, refers to the de minimis fraction of a second or nanosecond it takes for the two steps to occur in this sequence of the present invention. The Service Provider 215 is now the owner of the Bitcoin and the security of the Resource 210 within the trusted environment 215 is maintained. For each unsuccessful attempt 205 the User 225 is denied access 270 to the Resource 210 and is financially penalized. This authentication method of the present invention provides a secure and immutable process for the protection of both the User 225 and the Service Provider 215 from fraud and/or brute force attacks.

Figure 5:
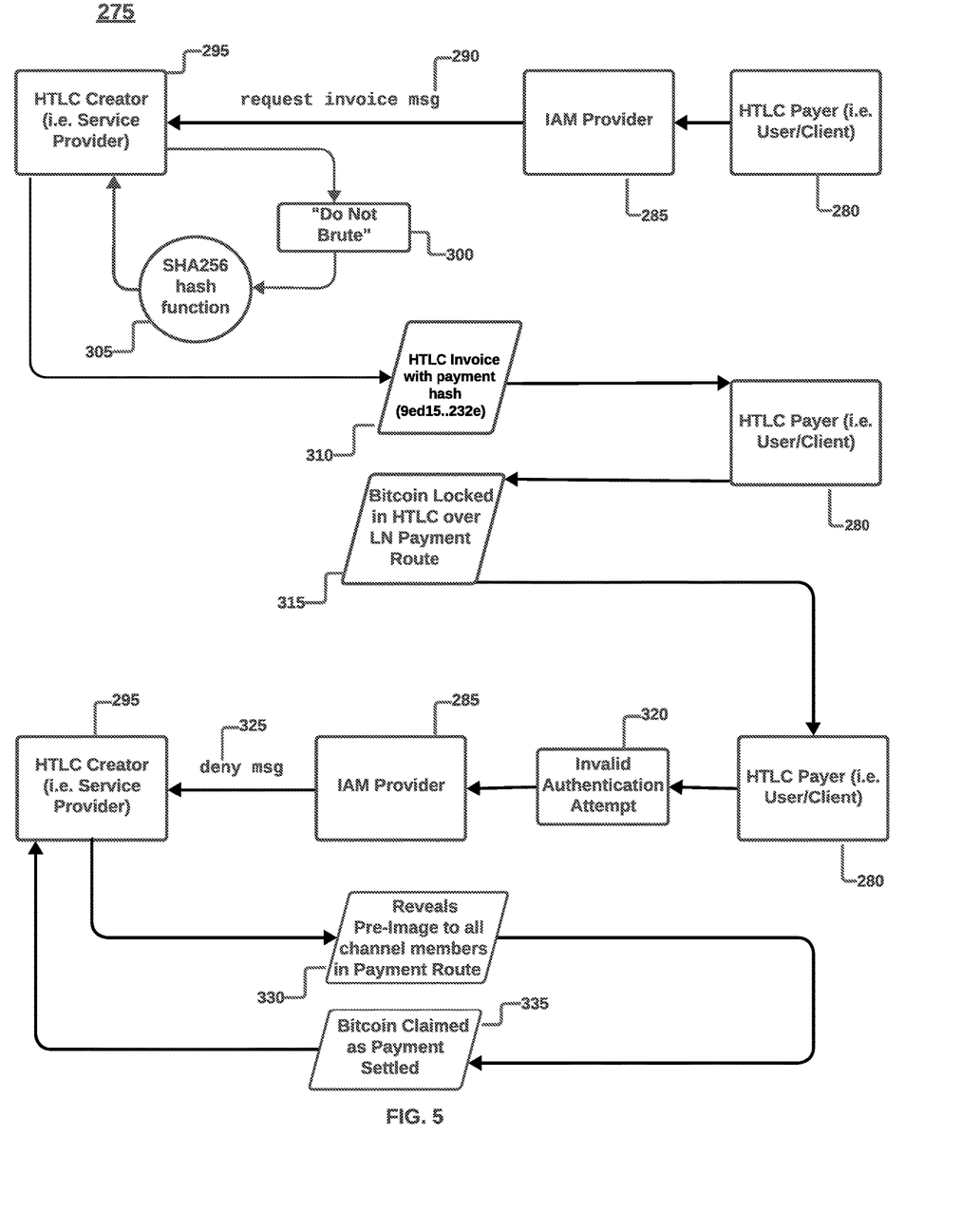
FIG. 5 is flow chart illustrating the cryptographic hash function for an unsuccessful authentication method of the present invention.

FIG. 5 provides a more detailed illustration of the sequence of steps for an unsuccessful authentication attempt via a Hash-Time-Locked-Contract (HTLC) 275. A HTLC User 280 via an IAM provider 285, requests access 290 from a service provider or HTLC Creator 295, and a cryptographic hash function is initiated to create Hold Invoice. The HTLC Creator 295 issues a specific Bitcoin script, in this case "Do Not Brute" 300 which is then processed through a mutually agreed upon algorithm, in this case SHA-256 hash function 305, resulting in a HTLC Hold Invoice with a distinct and immutable payment hash 310. The User 280 receives the HTLC Hold Invoice 310 instructions and pre-authorizes Bitcoin to the HTLC Hold Invoice over a LN Payment route 315. With Bitcoin securely held in the HTLC Hold Invoice 315, the User 280 initiates an invalid authentication attempt 320 which is processed by the IAM Provider 285 which sends a deny authorization message 325 to the HTLC Creator 295. Almost simultaneously, the User 280 is refused access to a Resource 210 (as shown in FIG. 4), and the HTLC Creator 295 reveals the pre-image 330 of the distinct hash to all channel members in the payment route, effectuating the transfer of the Bitcoin 335 to the HTLC Creator 295. The transfer of the Bitcoin to the HTLC Creator 295 represents a financial transaction where payment is instantly settled using the Bitcoin Lightning Network. Even with an unsuccessful authentication process, the Resource 210 and the User 280 are protected from fraud and any brute force attack, while an invalid user is penalized.

Figure 6:
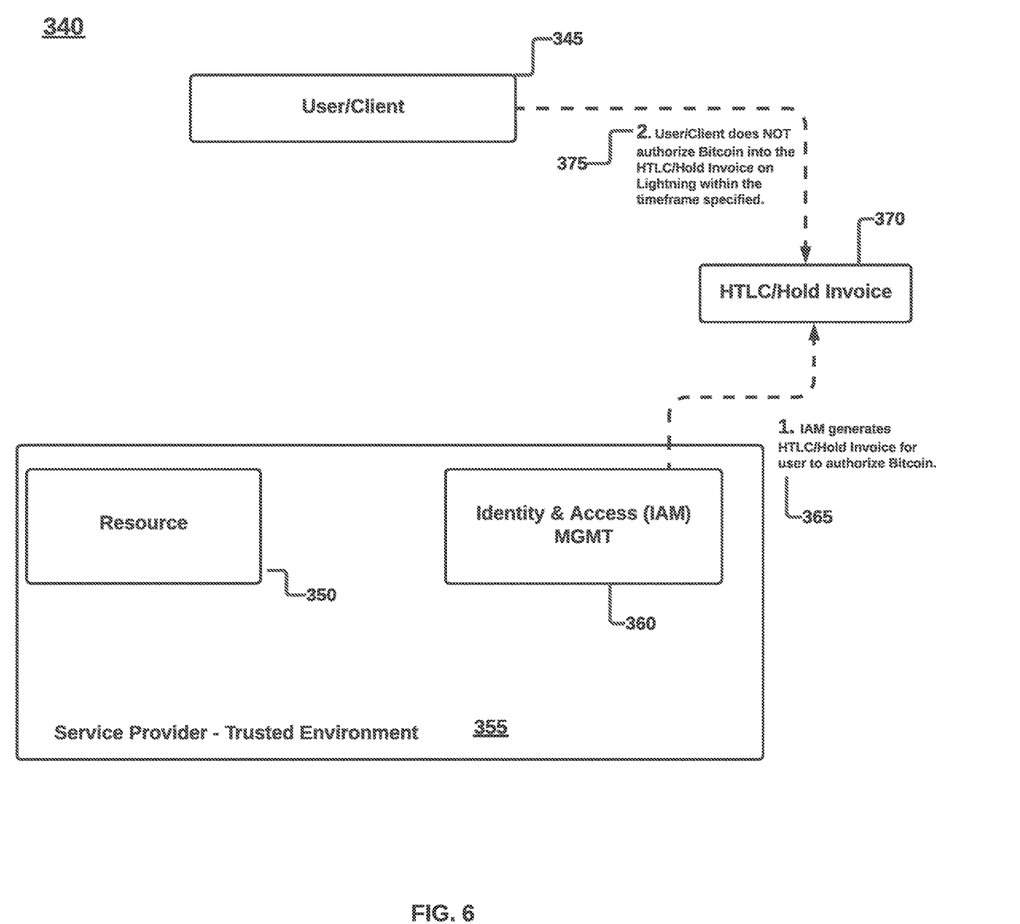
FIG. 6 is a flow chart illustrating method of the present invention when Bitcoin is not authorized.

FIG. 6 provides an illustration of the sequence of steps for an instance when Bitcoin is not authorized 340 by a User or Client 345. As shown in FIG. 6, a Resource 350 from a service provider has a trusted environment 355 that includes an identity and access management interface (IAM) 360 by which a User 345 requests access to the Resource 350 of the service provider. The User's 345 request for access prompts the IAM 360 to generate 365 a HTLC Hold Invoice 370 which instructs the User 345 to authorize Bitcoin into the HTLC Hold Invoice 370 on the Lightning Network. If the User does not authorize Bitcoin 375 to be moved into the HTLC Hold Invoice 370, then the sequence loops between the Client authorization step 375 and the HTLC Hold Invoice 370 for a set amount of time before timing out. The set amount of time may range from zero seconds to one hour (0 to 1 hour) in order to maintain the integrity of the authentication protocol. In an alternative instance, the set amount of time may be up to and including 5 hours. In the preferred embodiment of this invention, the set amount of time may be closer to seconds at the lower end and 2-5 minutes on the higher end.

In other embodiments of this invention, the authentication method may be automated with pre-set instructions and parameters in a closed system environment to automatically initiate access to the resource. In such a case, the resource's trusted environment would recognize corresponding computing device, computing network and computer program product that has been pre-authorized to operate in the closed system. In practice, only a user attempting to login from a corresponding computing device, computing network and computer program product outside of the closed system would receive instructions to authorize the movement of Bitcoin to a Hold Invoice. As an example, within a company or a company computing device, computing network and computer program product, the instruction to create a Hold Invoice and authorize movement of Bitcoin into a Hold Invoice would be pre-set to facilitate automatic and instant access to intra-company devices or systems.

Figure 7:
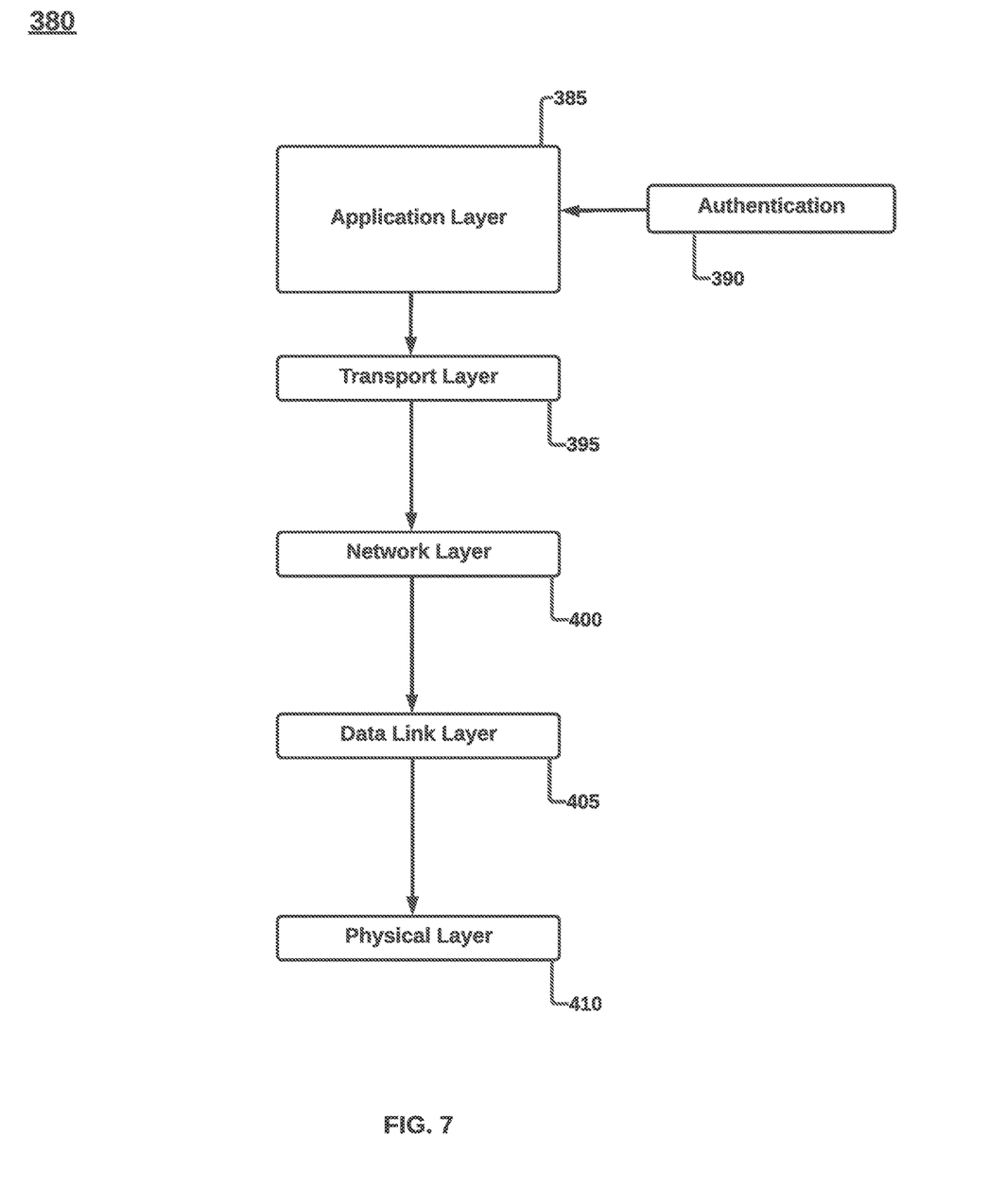
FIG. 7 is a flow chart illustrating a five-layer open systems interconnection (OSI) model included in the method of the present invention.

FIG. 7 illustrates the Five-Layer OSI Model 380 that underpins the method of this invention and thereby ensuring a secure and immutable authentication protocol for users and service providers. The first layer is the Application Layer 385 which provides a way for software to communicate over a network; and is responsible for high-level protocols and end-user services (e.g., HTTP, FTP, and SMTP). The authentication process 390 as disclosed herein occurs at the Applicant Layer 385 of the OSI Model. The second layer is the Transport Layer 395 which ensures reliable arrival of messages and provides error-checking mechanisms and data flow controls; and is responsible for end-to-end communication and port management (e.g., TCP (Transmission Control Protocol) and UDP (User Datagram Protocol)). The third layer is the Network Layer 400 which is responsible for routing packets from the source to the destination across the network; and handles logical addressing (e.g., IP (Internet Protocol), routers, and IP addresses). The fourth layer is the Data Link Layer 405 which is responsible for creating a reliable link between two directly connected to nodes; and handles error detection and connection in the Physical Layer 410 (e.g., Ethernet, MAC addresses, and switches). The fifth layer is the Physical Layer 410 which deals with the physical connection between devices; and is responsible for transmitting raw bits over a communication channel (e.g., Cables, switches, and network interface cards (NICs)).

In an alternate embodiment of the present invention, the Seven-Layer OSI Model may underpin the method of method of this invention to ensure a secure and immutable authentication protocol for users and service providers. The Seven-Layer OSI Model has two additional layers, the Presentation Layer and the Session Layer, which are known to one of ordinary skill in the art to which OSI Models belong. The authentication method of this invention would still occur at the Application Layer or the Seven-Layer to provide the same degree of protection from fraud and brute force attacks. Additionally, this invention is not limited to the two OSI Models disclosed herein, but is adaptable to other OSI Models, in particular those with an Application Layer.

Figure 8:
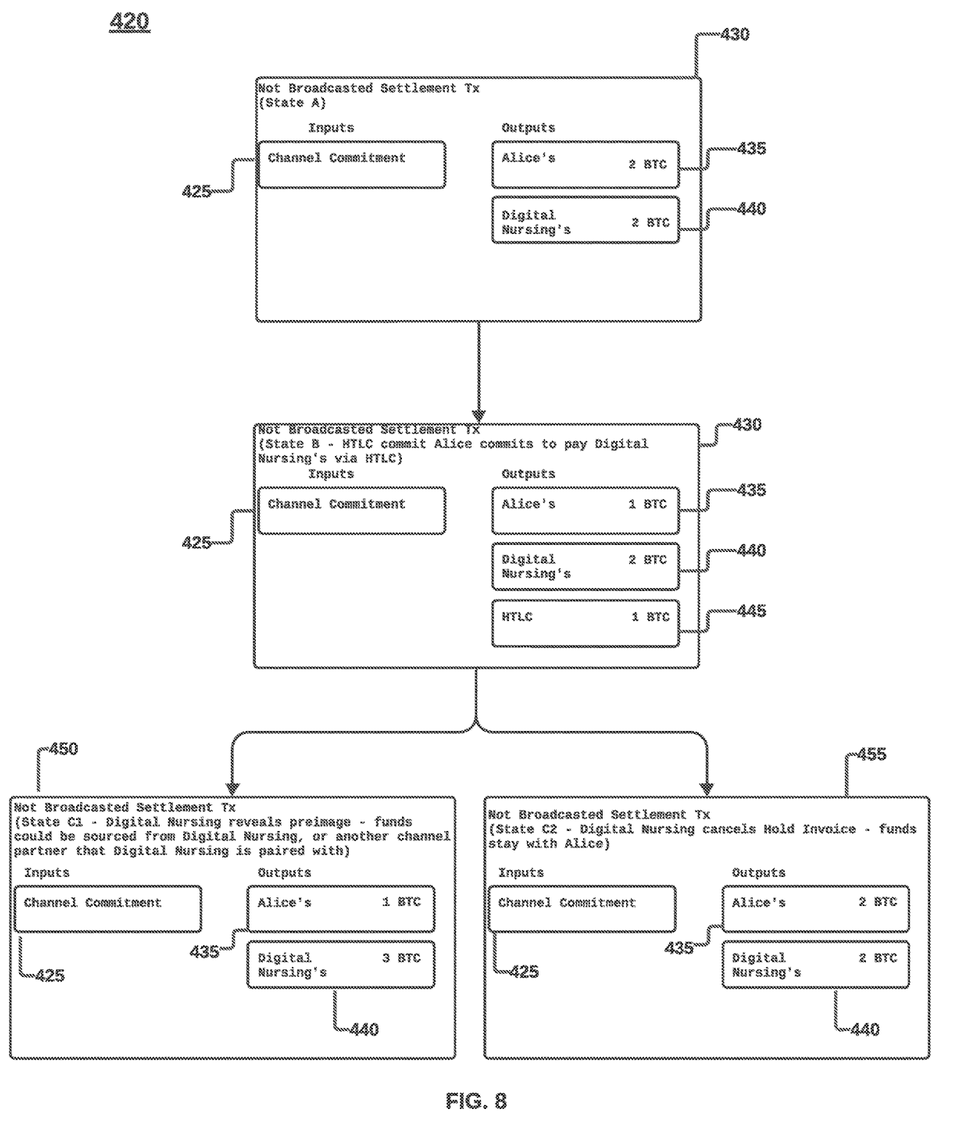
FIG. 8 is a diagram illustrating an example of the use of present invention.

FIG. 8 illustrates the HTLC Hold Invoice as it operates in a Channel as part of the present invention 420. A Channel 425 as used in this disclosure refers to an individual hop along the payment route in the Lightning Network. A hop refers to the process of routing a transaction through adjacent nodes in the Bitcoin Lightning Network from sender to receiver. A Payment Channel 430 is a trust-less mechanism for exchanging Bitcoin transactions between two parties outside of the bitcoin blockchain, thus transactions are not broadcasted up to the main blockchain. Users establish payment channels, enabling multiple transactions between participants without blockchain broadcasts for each transaction. Only when channels are initiated or closed are their transactions broadcasted to the Bitcoin blockchain. The diagram of FIG. 8 presents an example of the use of a HTLC Hold Invoice as described in the present invention. For purposes of this example, a transaction amount is represented by one (1) Bitcoin (1BTC) on the Bitcoin Lightning Network. The participants in this example are: (1) Alice 435 (User); and (2) Digital Nursing 440 (Service Provider). Alice 435 works as a contractor for Digital Nursing 440, and she needs to access their system to gather information on a patient she is tasked to serve on behalf of Digital Nursing 440. When Alice attempts to log into the system, Digital Nursing 440 creates a secret message, "Do Not Brute" (as shown in FIG. 3, 170 and FIG. 5, 300) and generates a specific hash (as shown in FIG. 3, 175 and FIG. 5, 305), which for this example is 9ed15 . . . 232e. In technical jargon, this secret message is termed the "payment pre-image", and its hash is the "payment hash". Digital Nursing 440 incorporates this payment hash into the Hold Invoice 445 and forwards it to Alice 435. This action prompts Alice 435 to authorize the withholding of 1 Bitcoin in the HTLC Hold Invoice 445. To finalize a Bitcoin transaction, Digital Nursing 440 is obligated to disclose the secret message. The message, if written in plain English would read:

"I, Alice, will pay Digital Nursing LLC 1 BTC if they can provide a secret message that hashes to 9ed15 . . . 232e and a valid signature to prove it is Digital Nursing.

The secret message that hashes to 9ed15 . . . 232e should only be revealed if my authentication material is unsuccessful.

If I authorize the release of the 1 Bitcoin to Digital Nursing and if the company doesn't send me the secret message within zero seconds to one hour, my Bitcoin held in a HTLC will be released.

The Hold Invoice 445 merely places a hold on the transaction; it does not execute a transfer of Bitcoin from Alice 435. Instead, this hold acts as a pledge from Alice 435 to Digital Nursing 440, signaling her genuine intent as a user. Her next step is to validate this intent by providing her authentication details.

If Alice's 435 authentication is successful 455, Digital Nursing 440 will void the Hold Invoice 445, effectively closing the Channel 425 without any Bitcoin changing hands or any transaction executed. Thus, both Alice 435 and Digital Nursing 440 each retain 2 Bitcoin in their respective wallets. However, if Alice's 435 authentication fails 450, Digital Nursing 440 will disclose the payment pre-image. The disclosure of the payment pre-image triggers the transfer of the previously authorized Bitcoin from Alice's 435 wallet directly to Digital Nursing's 440 account. Thus, Alice's 435 wallet decreases by 1 BTC, and Digital Nursing's 440 wallet increases by 1 BTC.

The present invention also includes a device configured for providing a service to a User or Client, which in particular can be a service provider, or a computing device configured for providing a service to a user. The device comprises a memory, and at least one processing unit, the memory containing instructions executable by said at least one processing unit, wherein execution of the instructions causes the device to execute the steps of the method as described and disclosed herein.

Alternatively, the present invention may include a device that is tailored for offering a service through an Application Programming Interface (API) connection to a network or computer program. This device can especially serve as a service provider or a computational apparatus designed to deliver services to a client. The device comprises a memory and at least one processing unit. The memory houses instructions that are executable by the aforementioned processing unit. When these instructions are executed, they prompt the device to carry out the procedures of a method of the embodiments of the invention described herein.

The present invention, includes non-transitory computer program product, comprising a computer readable hardware storage device having computer readable program code stored therein, said program code executable by a processor of a computer system to implement a method comprising a program code which is executed by the processor to execute a method for authenticating network access for a user to service provider resource utilizing the trustless framework of the Bitcoin Lightning Layer atop the Bitcoin Proof-of-Work Network comprising as described herein.

The present invention includes a system comprising a memory with instructions stored thereon; and a processing device, coupled to the memory; and the processing device configured to access the memory and execute the instructions, wherein the instructions cause the processing device to perform operations comprising: a user requesting access to a resource from a service provider; and then the service provider receiving the user's request for access; and then accessing the Bitcoin Network and the Bitcoin Lightning Network, creating a trustless environment; and initiating a cryptographic hash function to generate a pre-image hash for the creation of a Hold Invoice, whereby the pre-image functions as a smart contract script that provides instructions to the user; and then the user receiving instructions to leverage Bitcoin to meet conditions of the Hold Invoice; and the user pre-authorizing movement of Bitcoin into the Hold Invoice to meet the conditions of the Hold Invoice; and the Hold Invoice holding the Bitcoin; and then prompting the user to initiate an authentication attempt by inputting authentication material; and authenticating the user successfully, canceling the Hold Invoice, releasing the Bitcoin back to the user, and at the same time issuing an access token to the user allowing login to the service provider resource.

The present invention includes a system comprising a memory with instructions stored thereon; and a processing device, coupled to the memory; and the processing device configured to access the memory and execute the instructions, wherein the instructions cause the processing device to perform operations comprising: a user requesting access to a resource from a service provider; and then the service provider receiving the user's request for access; and then accessing the Bitcoin Network and the Bitcoin Lightning Network, creating a trustless environment; and initiating a cryptographic hash function to generate a pre-image hash for the creation of a Hold Invoice, whereby the pre-image functions as a smart contract script that provides instructions to the user; and then the user receiving instructions to leverage Bitcoin to meet conditions of the Hold Invoice; and the user pre-authorizing movement of Bitcoin into the Hold Invoice to meet the conditions of the Hold Invoice; and the Hold Invoice holding the Bitcoin; and then prompting the user to initiate an authentication attempt by inputting authentication material; authenticating the user is not successful, revealing the pre-image of the Hold Invoice, transferring the Bitcoin to the service provider as a settled payment transaction, and at the same time denying the user access to the service provider resource; and ending the authentication process.

EQUIVALENTS

Those skilled in the art will recognize or be able to ascertain using no more than routine experimentation, many equivalents to the specific embodiments of the invention described herein. Such equivalents are intended to be encompassed by the claims.

What is claimed is:

1. A computer implemented method for zero-trust authentication utilizing the Bitcoin Lightning Network layered atop the Bitcoin Proof-of-Work Network, the method comprising:

a user requests access to a resource from a service provider via an access management interface; and the service provider receives the user's request for access; and a cryptographic hash function is initiated to generate a pre-image hash for the creation of a Hold Invoice, whereby the pre-image functions as a smart contract script that provides instructions to the user; and the user receives instructions to leverage Bitcoin to meet conditions of the Hold Invoice; and the user pre-authorizes movement of Bitcoin into the Hold Invoice to meet the conditions of the Hold Invoice; and the Hold Invoice holds the Bitcoin; and the user is prompted to initiate an authentication attempt by inputting authentication material; and when a successful authentication is achieved, the Hold Invoice is canceled, releasing the Bitcoin back to the user, and at the same time an access token is issued to the user by the service provider, via the access management interface, which access token allows the user to log into the service provider resource; or when an unsuccessful authentication occurs, whereby the access management interface is not able to verify the authentication material and issue an access token, the pre-image of the Hold Invoice is revealed, transferring the Bitcoin to the service provider as a settled payment transaction, and at the same time the user is denied access to service provider resource; and the zero-trust authentication ends.

2. The computer implemented method for zero-trust authentication utilizing the Bitcoin Lightning Network layered atop the Bitcoin Proof-of-Work Network of claim 1 wherein a user receives instructions to leverage a fraction of Bitcoin ranging from 0.00000001 BTC up to and including 0.99999999 BTC.

3. The computer implemented method for zero-trust authentication utilizing the Bitcoin Lightning Network layered atop the Bitcoin Proof-of-Work Network of claim 1 wherein a user receives instructions to leverage one Bitcoin.

4. The computer implemented method for zero-trust authentication utilizing the Bitcoin Lightning Network layered atop the Bitcoin Proof-of-Work Network of claim 1 wherein a user receives instructions to leverage greater than one Bitcoin.

5. The computer implemented method for zero-trust authentication utilizing the Bitcoin Lightning Network layered atop the Bitcoin Proof-of-Work Network of claim 1 wherein the user is an application programming interface (API).

6. A computer implemented method for zero-trust authentication utilizing the Bitcoin Lightning Network layered atop the Bitcoin Proof-of-Work Network, the method comprising:
   a user requests access to a resource from a service provider via an access management interface; and
   the service provider receives the user's request for access; and
   a Hash-Time-Locked-Contract (HTLC) function is initiated to generate a pre-image hash for the creation of a HTLC Hold Invoice, whereby the pre-image functions as a smart contract script that provides instructions to the user; and
   the user receives instructions to leverage Bitcoin to meet conditions of the HTLC Hold Invoice; and
   the user pre-authorizes movement of Bitcoin into the HTLC Hold Invoice to meet the conditions of the HTLC Hold Invoice; and
   the HTLC Hold Invoice holds the Bitcoin; and
   the user is prompted to initiate an authentication attempt by inputting authentication material; and
   when a successful authentication is achieved, the HTLC Hold Invoice is canceled, releasing the Bitcoin back to the user, and at the same time an access token is issued to the user by the service provider, via the access management interface, which access token allows the user to log into the service provider resource; or
   when an unsuccessful authentication occurs, whereby the access management interface is not able to verify the authentication material and issue an access token, the pre-image of the HTLC Hold Invoice is revealed, transferring the Bitcoin to the service provider as a settled payment transaction, and at the same time the user is denied access to service provider resource; and
   the zero-trust authentication method ends.

7. The computer implemented method for zero-trust authentication utilizing the Bitcoin Lightning Network layered atop the Bitcoin Proof-of-Work Network of claim 6 wherein a user receives instructions to leverage a fraction of Bitcoin ranging from 0.00000001 BTC up to and including 0.99999999 BTC.

8. The computer implemented method for zero-trust authentication utilizing the Bitcoin Lightning Network layered atop the Bitcoin Proof-of-Work Network of claim 6 wherein a user receives instructions to leverage one Bitcoin.

9. The computer implemented method for zero-trust authentication utilizing the Bitcoin Lightning Network layered atop the Bitcoin Proof-of-Work Network of claim 6 wherein a user receives instructions to leverage greater than one Bitcoin.

10. The computer implemented method for zero-trust authentication utilizing the Bitcoin Lightning Network layered atop the Bitcoin Proof-of-Work Network of claim 6 wherein the user is an application programming interface (API).

11. The computer implemented method for zero-trust authentication utilizing the Bitcoin Lightning Network layered atop the Bitcoin Proof-of-Work Network of claim 6, wherein a Point-Time-Locked-Contract (PTLC) script is used to generate a pre-image hash for creating a PTLC Hold Invoice.

12. A non-transitory computer program product, comprising a computer readable hardware storage device having computer readable program code stored therein, said program code executable by a processor of a computer system to implement a method comprising a program code which is executed by the processor to execute a method for authenticating network access for a user to service provider resource utilizing the trustless framework of the Bitcoin Lightning Layer atop the Bitcoin Proof-of-Work Network according to claim 1.

13. A system comprising a memory with instructions stored thereon; and a processing device, coupled to the memory; and the processing device configured to access the memory and execute the instructions, wherein the instructions cause the processing device to perform operations according to claim 1.

14. A computer implemented method for zero-trust authentication utilizing the Bitcoin Lightning Network layered atop the Bitcoin Proof-of-Work Network within a closed system, comprising:
   the closed system which components comprise: a secure network of devices;
   a pre-set set of parameters to automate a user's request to access a resource of a service provider;
   and an access management interface; and
   within the closed system the user's request for access is received by the network of devices which activates recognition of the set of parameters for a user's device within the secure network of devices, and prompts the access management interface to begin automated authentication; and then
   the access management interface initiates a cryptographic hash function to generate a pre-image hash for the creation of a Hold Invoice, whereby the pre-image functions as a script that provides instructions to the user's device; and the user's device receives instructions to leverage Bitcoin to meet conditions of the Hold Invoice; and the user's device pre-authorizes movement of Bitcoin into the Hold Invoice to meet the conditions of the Hold Invoice; and the Hold Invoice holds the Bitcoin; and the user is prompted to initiate an authentication attempt by inputting authentication material; and when a successful authentication is achieved, the Hold Invoice is canceled, releasing the Bitcoin back to a wallet of the closed system, and at the same time an access token is issued to the user by the service provider, via the access management interface, which access token allows the user to log into the service provider resource; or
   when an unsuccessful authentication occurs, whereby the access management interface is not able to verify the authentication material and issue an access token, the pre-image of the Hold Invoice is revealed, transferring the Bitcoin to the service provider as a settled payment transaction, and at the same time the user is denied access to service provider resource; and
   the zero-trust authentication within a closed system is automated, starting and ending on a repeated loop within the closed system.

* * * * *